Figure 1:
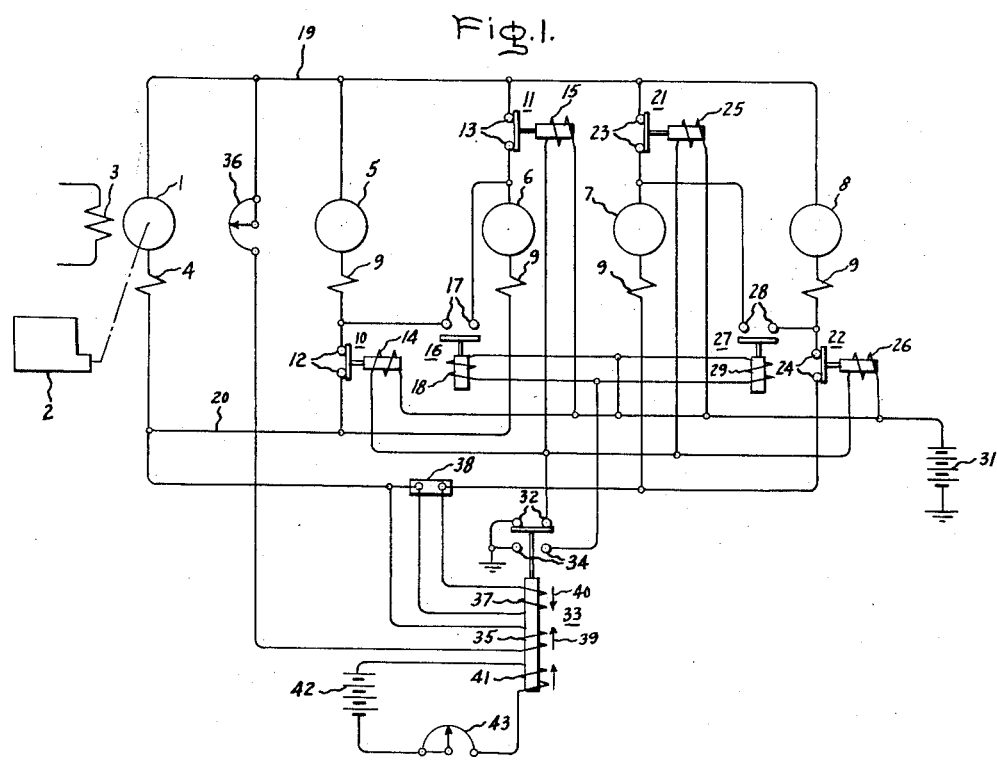

Nov. 3, 1953   T. J. WARRICK   2,658,174
FRACTION MOTOR SYSTEM WITH SERIES-PARALLEL SWITCHING RELAY
Filed Sept. 25, 1951

Inventor:
Thurlow J. Warrick,
by Ernest C. Britton
His Attorney.

Patented Nov. 3, 1953

2,658,174

UNITED STATES PATENT OFFICE 2,658,174

TRACTION MOTOR SYSTEM WITH SERIES-PARALLEL SWITCHING RELAY

Thurlow J. Warrick, Erie, Pa., assignor to General Electric Company, a corporation of New York Application September 25, 1951, Serial No. 248,134

4 Claims. (Cl. 318—83)

This invention relates to motor control systems and more particularly to control systems for the traction motors of self-propelled vehicles, such as diesel-electric locomotives.

In the design of the motor control system for the traction motors of a self-propelled vehicle, such as a diesel-electric locomotive, it is customary to provide means for changing the motor connections from a series to a parallel arrangement as the locomotive speed increases in order to obtain the most efficient utilization of the prime mover. The transfer of motor connections, or in the alternative weakening of the traction motor fields by shunting, is customarily accomplished at a predetermined locomotive speed. This transition may be accomplished automatically by the use of a transition relay responsive to the generator output voltage and generator line current which provides an indirect measure of locomotive speed. This arrangement alone, however, has several disadvantages since there are a number of adjustments and any one adjustment may result in more than one change in the operating characteristics. Furthermore, it will be readily apparent that more than one combination of generator voltage and line current within the operating range of the generator may cause the transition relay to operate.

It is therefore an object of this invention to provide an improved motor control system, particularly for the traction motors of a self-propelled vehicle, wherein the transfer of motor connections is accomplished at only one combination of generator voltage and current within the generator characteristic curve for the prime mover speed.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a plurality of traction motors are provided with a traction generator connected to energize the motors. Switching means are provided for changing the motor connections and transition means are provided responsive to generator output voltage and generator line current for actuating the switching means at a predetermined combination of a generator voltage and current. In order to insure that transition takes place at only one combination of generator voltage and line current within the generator characteristic curve for the prime mover speed, a fixed voltage bias is provided on the transition means and adjustment is accomplished by three independent adjustments.

Figure 2:
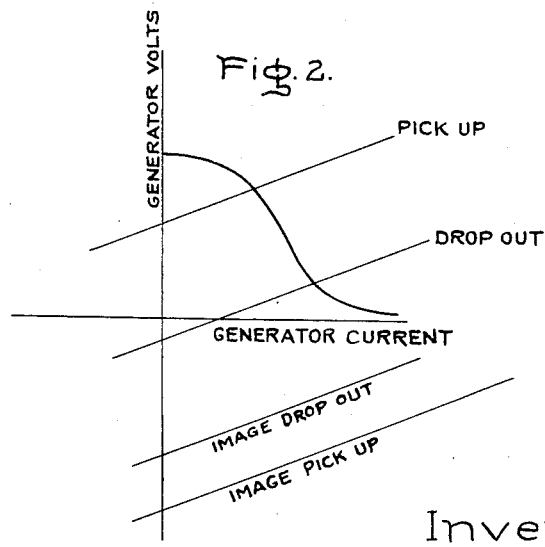

In the drawing, Fig. 1 is a schematic illustration showing the improved traction motor control system of this invention; and Fig. 2 shows the generator characteristic curve for one speed of the generator of Fig. 1 with the pickup, dropout, and image pickup and dropout characteristics of the transition relay superimposed thereon. It will be readily understood that there is actually a generator characteristic curve for each generator speed, i. e., one for each throttle position of the prime mover.

Referring now to Fig. 1, there is shown a traction generator 1 driven by a suitable prime mover 2, such as a diesel engine. Generator 1 is provided with a separately excited shunt field 3 energized from an external source (not shown) and a commutating field 4. A first pair of traction motors 5 and 6 are provided, which may be on one of the trucks of the locomotive, and a second pair of traction motors 7 and 8 are also provided which may be on another truck of the locomotive. Each of the traction motors 5, 6 7 and 8 is provided with a series field winding 9. In order to provide for changing the connections of the traction motors 5 and 6, paralleling switches 10 and 11 are provided having contacts 12 and 13 respectively arranged in series with the motors 5 and 6 as shown. The contacts 10 and 11 are provided with operating coils 14 and 15 connected as will be hereinafter described. A series switch 16 is provided interconnecting the motors 5 and 6 with contacts 17 arranged as shown and with an operating coil 18. The circuits of the motors 5 and 6, including the series fields 9 and the contacts 12 and 13 of the switches 10 and 11 are connected across lines 19 and 20. The traction motors 7 and 8 are also provided with paralleling switches 21 and 22 having contacts 23 and 24 arranged in series respectively with the motors 7 and 8 and also having operating coils 25 and 26. Series switch 27 interconnects motors 7 and 8 and has contacts 28 and operating coil 29, the traction motors 7 and 8 being connected across lines 19 and 30. It will be readily apparent that when the paralleling switches 10, 11, 21 and 22 are energized so that their contacts 12, 13, 23 and 24 are respectively closed, and when series contacts 17 and 28 are open, the traction motors 5, 6, 7 and 8 are connected in parallel across the generator output. It will also be readily apparent that when the paralleling contacts 12, 13, 23 and 24 are open and the series contacts 17 and 28 are closed, traction motors 5 and 6 will be connected in series across lines 19 and 20 and traction motors 7 and 8 will be connected in series across lines 19 and 30.

In order to actuate the transfer switches referred to above, the paralleling switch operating coils 14, 15, 25 and 26 are connected in parallel across the positive side of the battery 31 and the contacts 32 of transition relay 33, the contacts 32 being in turn connected to ground to complete the circuit. The operating coils 18 and 29 of the series switches 16 and 27 are also connected in parallel across the positive side of the battery 31 and the contacts 34 of transition relay 33, the other side of these contacts being also connected to ground as shown. It will now be readily apparent that when the transition relay 33 is picked up, closing the contacts 32, the operating coils 14, 15, 25 and 26 of paralleling switches 10, 11, 21 and 22 will be energized closing the contacts 12, 13, 23 and 24 to connect the traction motors 5, 6, 7 and 8 in parallel, the series switches 16 and 27 being open. When the transition relay 33 is dropped out, the contacts 34 will be closed de-energizing the paralleling switch operating coils 14, 15, 25 and 26 and energizing the series switch operating coils 18 and 29 to close contacts 17 and 28, thus placing traction motors 5 and 6 in series across lines 19 and 20 and traction motors 7 and 8 in series across lines 19 and 30.

In order to energize the transition relay 33, the relay is provided with a first operating coil 35 connected across lines 19 and 30 for energization from the output voltage of the generator 1. Adjusting potentiometer 36 is arranged in series with the operating coil 35. A second operating coil 37 is energized from shunt 38 arranged in series with line 30. The voltage-responsive operating coil 35 and the current-responsive operating coil 37 are connected in opposition, as shown by the arrows 39 and 40 so that the resultant flux is the difference between the two. It will be readily apparent that while the operating coil 35 is energized responsive to generator output voltage and the operating coil 37 is energized responsive to the current in the motors 7 and 8, a number of different combinations of generator voltage and current within the generator characteristic curve for particular prime mover speed will produce the same resultant ampere turns causing the transition relay 33 to pick up to change the motor connections. In order to insure that the transition relay 33 will operate only at one combination of generator voltage and current within the generator characteristic curve for the prime mover speed, a third operating coil 41 is provided energized from a fixed voltage bias, such as battery 42, with potentiometer 43 being provided for adjustment. The operating coil 41 is arranged to aid the voltage-responsive coil 35, as shown by the arrow 43. It will now be readily apparent that by virtue of the fixed voltage bias provided by the operating coil 41, the transition relay 33 will pick up on only one predetermined combination of generator voltage and current within the generator characteristic curve for the particular throttle position.

Referring now to Fig. 2, there is shown a characteristic curve for the generator 1 for one prime mover speed, i. e., throttle position, together with the pickup, dropout, and image pickup and dropout characteristics for the transition relay 33.

Obtaining the proper pickup and dropout curves is accomplished by three independent adjustments. Increasing the ampere-turns of the fixed voltage bias operating coil 41 by adjustment of potentiometer 43 will simultaneously lower the pickup and dropout curves, but will not change the slope thereof. Increasing the ratio between the generator voltage and the ampere-turns in the voltage coil 35, by adjustment of potentiometer 36, will change the slope of the pickup curve, this curve rotating around zero voltage and negative current. The dropout curve is moved by the adjustment of a conventional adjusting screw on the armature of the relay (not shown). This adjustment raises or lowers the dropout curve but does not affect the slope nor the pickup curve. Thus, the bias coil 41 permits raising and lowering the pickup and dropout curves of the relay 33 without changing the slope thereof and also permits calibration of the relay so that the image pickup and dropout curves are outside the limits of the generator characteristic curve.

It will now be readily apparent that this invention provides an improved control system for traction motors wherein transition from one motor connection to another is automatically accomplished by means of a transition relay which is responsive to only one combination of generator voltage and current within the limits of the generator characteristic curves.

While I have illustrated and described a particular embodiment of this invention, further modifications and improvements will occur to those skilled in the art. I desire it to be understood, therefore, that this invention is not limited to a particular form shown and I intend in the appended claims to cover all modifications which do not depart from the spirit and scope of this invention.

What I claim as new and desire to secure by Letters Patent of the United States is:

1. In combination, a plurality of motors, a generator connected to energize said motors, switching means arranged in circuit with said motors for changing the connections thereof, and transition control means including a relay biased to a predetermined position having a first operating coil connected for energization responsive to generator output voltage and a second operating coil connected for energization responsive to generator line current and contacts connected to actuate said switching means in response to a predetermined combination of generator voltage and current, said relay having a third operating coil connected for energization from a fixed voltage bias whereby said relay will only pick up on one combination of generator voltage and current within the limits of the generator characteristic curves.

2. In combination, a plurality of motors, a generator connected to energize said motors, switching means arranged in circuit with said motors for changing the connections thereof, and transition control means including a relay biased to a predetermined position having a first operating coil connected across said generator for energization responsive to the output voltage thereof and a second operating coil connected in series with said generator for energization in response to the line current thereof, said second operating coil being arranged to oppose said first operating coil, said relay having contacts connected to actuate said switching means in response to a predetermined combination of generator voltage and current, said relay having a third operating coil connected for energization from a fixed voltage bias and arranged to aid said first operating coil whereby said relay will only pick up on one combination of generator voltage and current within the limits of the generator characteristic curves.

3. In combination, a plurality of motors, a generator connected to energize said motors, means including a plurality of switches each having an operating coil and contacts respectively connected in the circuits of said motors for changing connections thereof, and transition control means including a relay biased to a predetermined position having a first operating coil connected across said generator for energization in response to the output voltage thereof and a second operating coil connected in series with said generator for energization in response to line current thereof, said second operating coil being arranged to oppose said first operating coil, said relay having contacts connected in circuit with said first-mentioned operating coils for operating said switches in response to a predetermined combination of generator voltage and current, said relay having a third operating coil connected for energization from a fixed voltage bias and arranged to aid said first operating coil whereby said relay will only pick up on one combination of generator voltage and current within the limits of the generator characteristic curves.

4. In combination, a plurality of groups of motors, a generator connected to energize said motors, means including a plurality of switches each having an operating coil and contacts respectively connected in the circuits of said motors for changing the connections of each of said groups of motors, and transition control means including a relay biased to a predetermined position having a first operating coil connected across said generator for energization in response to the output voltage thereof and a second operating coil connected in series with one of said groups of motors for energization in response to the current therein, said second operating coil being arranged to oppose said first operating coil, said relay having contacts connected in circuit with said first-mentioned operating coils for operating said switches in response to the predetermined combination of generator voltage and current, said relay having a third operating coil connected for energization from a fixed voltage bias and arranged to aid said first operating coil whereby said relay will only pick up on one combination of generator voltage and current within the limits of the generator characteristic curves.

THURLOW J. WARRICK.

References Cited in the file of this patent
UNITED STATES PATENTS

| Number | Name | Date |
|---|---|---|
| 2,264,853 | McNairy | Dec. 2, 1941 |
| 2,317,253 | Cowin | Apr. 20, 1943 |
| 2,383,813 | Ogden | Aug. 28, 1945 |
| 2,419,178 | Strong | Apr. 15, 1947 |